(12) United States Patent
Cheal (10) Patent No.: US 7,980,585 B2
(45) Date of Patent: Jul. 19, 2011

(54) AIRBAG MOUNTING ASSEMBLIES WITH DOUBLE-LOCKING WRAPPERS

(75) Inventor: Blake Cheal, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/495,243

(22) Filed: Jun. 30, 2009

(65) Prior Publication Data

US 2010/0327564 A1    Dec. 30, 2010

(51) Int. Cl.
*B60R 21/20* (2006.01)
(52) U.S. Cl. ............... 280/728.2; 280/730.2; 280/743.1
(58) Field of Classification Search ............... 280/728.2, 280/730.2, 743.1
See application file for complete search history.

(56) References Cited

U.S. PATENT DOCUMENTS

| | | | |
|---|---|---|---|
| 5,746,690 A | 5/1998 | Humbarger et al. | |
| 5,899,486 A * | 5/1999 | Ibe | 280/728.2 |
| 5,944,342 A * | 8/1999 | White et al. | 280/729 |
| 6,073,961 A | 6/2000 | Bailey et al. | |
| 6,099,026 A | 8/2000 | Ando et al. | |
| 6,209,907 B1 | 4/2001 | Fischer | |
| 6,223,389 B1 | 5/2001 | Walsh et al. | |
| 6,305,707 B1 | 10/2001 | Ishiyama et al. | |
| 6,412,810 B1 | 7/2002 | Wipasuramonton et al. | |
| 6,415,560 B1 | 7/2002 | Rinderer | |
| 6,550,809 B1 | 4/2003 | Masuda et al. | |
| 6,626,456 B2 * | 9/2003 | Terbu et al. | 280/728.2 |
| 6,672,612 B2 | 1/2004 | Sauer et al. | |
| 6,705,635 B2 | 3/2004 | Hoeft et al. | |
| 6,743,162 B2 | 6/2004 | Hieber et al. | |
| 6,749,220 B1 | 6/2004 | Wipasuramonton et al. | |
| 6,758,490 B2 | 7/2004 | Hoeft et al. | |
| 6,796,576 B2 | 9/2004 | Aoki et al. | |
| 6,851,702 B2 | 2/2005 | Henderson et al. | |
| 6,889,999 B2 | 5/2005 | Dominissini et al. | |
| 6,902,187 B2 * | 6/2005 | Sonnenberg | 280/730.2 |
| 6,991,256 B2 | 1/2006 | Henderson et al. | |

(Continued)

FOREIGN PATENT DOCUMENTS

DE    10 2005 012 845    9/2006

(Continued)

OTHER PUBLICATIONS

Notification of Transmittal of the International Search Report and the Written Opinion of the International Searching Authority issued Sep. 4, 2008 in International Application No. PCT/US2008/059648.

(Continued)

*Primary Examiner* — Ruth Ilan
*Assistant Examiner* — James English
(74) *Attorney, Agent, or Firm* — Sally J. Brown; Stoel Rives LLP (57) ABSTRACT

Mounting assemblies can be used to retain an inflatable curtain airbag in a packaged configuration and attach the inflatable curtain airbag to a vehicle structure. The mounting assemblies can have a mounting structure and a wrapper that are both coupled to inflatable curtain airbag. The mounting structure is attached to a vehicle structure and the wrapper wraps and retains the inflatable curtain airbag in a packaged configuration. During airbag deployment, the wrapper releases the airbag so that the airbag can adopt a deployed configuration, wherein the mounting structure continues to anchor the inflatable curtain airbag to the vehicle structure.

11 Claims, 10 Drawing Sheets

U.S. PATENT DOCUMENTS

| | | | |
|---|---|---|---|
| 7,083,188 B2 | 8/2006 | Henderson et al. | |
| 7,097,200 B2 | 8/2006 | Wold | |
| 7,121,579 B2 | 10/2006 | Ochiai et al. | |
| 7,125,037 B2 | 10/2006 | Tallerico et al. | |
| 7,159,896 B2 | 1/2007 | Ochiai et al. | |
| 7,163,231 B2 | 1/2007 | Kumagai | |
| 7,172,212 B2 | 2/2007 | Aoki et al. | |
| 7,261,682 B2 | 8/2007 | Crookston et al. | |
| 7,328,911 B2 * | 2/2008 | Chapman | 280/728.2 |
| 7,344,154 B2 | 3/2008 | Yokoyama et al. | |
| 7,357,408 B2 | 4/2008 | Hall et al. | |
| 7,407,182 B2 * | 8/2008 | Aoki et al. | 280/730.2 |
| 7,478,826 B2 * | 1/2009 | Soderquist et al. | 280/728.2 |
| 7,547,038 B2 | 6/2009 | Coleman | |
| 7,568,730 B2 * | 8/2009 | Kwon | 280/743.2 |
| 7,641,220 B2 | 1/2010 | Visker et al. | |
| 7,731,224 B2 | 6/2010 | Enriquez et al. | |
| 7,823,914 B2 | 11/2010 | Cheal et al. | |
| 2002/0158450 A1 | 10/2002 | Hoeft et al. | |
| 2002/0195803 A1 * | 12/2002 | Terbu et al. | 280/730.2 |
| 2003/0006589 A1 | 1/2003 | Aoki et al. | |
| 2003/0042712 A1 | 3/2003 | Henderson et al. | |
| 2003/0184057 A1 | 10/2003 | Kumagai | |
| 2004/0000775 A1 | 1/2004 | Henderson et al. | |
| 2005/0010335 A1 | 1/2005 | Kettenacker et al. | |
| 2005/0029778 A1 | 2/2005 | Weber et al. | |
| 2005/0046154 A1 | 3/2005 | Rhea et al. | |
| 2005/0104335 A1 * | 5/2005 | Henderson et al. | 280/728.2 |
| 2005/0110256 A1 | 5/2005 | Cookston et al. | |
| 2005/0121887 A1 | 6/2005 | Inoue et al. | |
| 2005/0179238 A1 | 8/2005 | Kippschull et al. | |
| 2005/0206138 A1 | 9/2005 | Breuninger et al. | |
| 2005/0236815 A1 | 10/2005 | Kismir et al. | |
| 2006/0043703 A1 * | 3/2006 | Enriquez | 280/730.2 |
| 2006/0119084 A1 | 6/2006 | Coon et al. | |
| 2006/0138762 A1 | 6/2006 | Jang | |
| 2006/0192368 A1 * | 8/2006 | Hall et al. | 280/730.2 |
| 2006/0197316 A1 | 9/2006 | Watanabe | |
| 2006/0237957 A1 | 10/2006 | Woydick | |
| 2007/0003390 A1 | 1/2007 | Kawai | |
| 2007/0019891 A1 | 1/2007 | Daniel | |
| 2007/0024031 A1 | 2/2007 | Coleman | |
| 2007/0090630 A1 | 4/2007 | Wilmot | |
| 2007/0090634 A1 | 4/2007 | Jang et al. | |
| 2007/0126211 A1 | 6/2007 | Moerke et al. | |
| 2007/0216139 A1 | 9/2007 | Mazanek et al. | |
| 2007/0296189 A1 | 12/2007 | Berntsson et al. | |
| 2008/0061535 A1 * | 3/2008 | Everard et al. | 280/728.2 |
| 2008/0197610 A1 | 8/2008 | Downey | |
| 2008/0217892 A1 * | 9/2008 | Maripudi et al. | 280/740 |
| 2008/0217896 A1 | 9/2008 | Visker et al. | |
| 2008/0224457 A1 | 9/2008 | Brough et al. | |
| 2008/0284142 A1 * | 11/2008 | Cheal et al. | 280/730.2 |
| 2011/0018245 A1 | 1/2011 | Hatfield et al. | |
| 2011/0042923 A1 * | 2/2011 | Hatfield et al. | 280/730.2 |
| 2011/0057422 A1 * | 3/2011 | Cheal et al. | 280/728.2 |

FOREIGN PATENT DOCUMENTS

| | | |
|---|---|---|
| GB | 2309942 | 8/1997 |
| WO | WO-2004/087471 | 10/2004 |
| WO | WO 2006/097309 | 9/2006 |
| WO | WO 2007/018650 | 2/2007 |
| WO | WO 2008/109396 | 9/2008 |
| WO | WO 2008/144121 | 11/2008 |
| WO | WO-2011/022614 | 2/2011 |
| WO | WO-2011/031584 | 3/2011 |

OTHER PUBLICATIONS

Office Action mailed Oct. 18, 2010 in co-pending U.S. Appl. No. 12/507,699.

Notification of Transmittal of the International Search Report and the Written Opinion of the International Searching Authority issued Oct. 26, 2010 in International Application No. PCT/US2010/047258.

Notification of Transmittal of the International Search Report and the Written Opinion of the International Searching Authority issued Oct. 20, 2010 in International Application No. PCT/US2010/046113.

Office Action issued Apr. 16, 2007 in U.S. Appl. No. 11/068,662, now U.S. Patent No. 7,357,408.

Amendment and Response to Office Action filed Oct. 16, 2007 in U.S. Appl. No. 11/068,662, now U.S. Patent No. 7,357,408.

Notice of Allowance and Fee(s) Due issued Dec. 4, 2007 in U.S. Appl. No. 11/068,662, now U.S. Patent No. 7,357,408.

Office Action issued Mar. 26, 2008 in U.S. Appl. No. 11/192,258, now U.S. Patent No. 7,547,038.

Response to Requirement for Election filed May 23, 2008 in U.S. Appl. No. 11/192,258, now U.S. Patent No. 7,547,038.

Office Action issued Aug. 8, 2008 in U.S. Appl. No. 11/192,258, now U.S. Patent No. 7,547,038.

Amendment and Response to Office Action filed Nov. 25, 2008 in U.S. Appl. No. 11/192,258, now U.S. Patent No. 7,547,038.

Notice of Non-Compliant Amendment issued Dec. 8, 2008 in U.S. Appl. No. 11/192,258, now U.S. Patent No. 7,547,038.

Interview Summary issued Dec. 9, 2008 in U.S. Appl. No. 11/192,258, now U.S. Patent No. 7,547,038.

Response to Notice of Non-Compliant Amendment filed Dec. 10, 2008 in U.S. Appl. No. 11/192,258, now U.S. Patent No. 7,547,038.

Notice of Allowance and Fee(s) Due issued Dec. 24, 2008 in U.S. Appl. No. 11/192,258, now U.S. Patent No. 7,547,038.

Summary of Interview filed Jan. 5, 2009 in U.S. Appl. No. 11/192,258, now U.S. Patent No. 7,547,038.

Request for Continued Examination filed Jan. 21, 2009 in U.S. Appl. No. 11/192,258, now U.S. Patent No. 7,547,038.

Notice of Allowance and Fee(s) Due issued Feb. 27, 2009 in U.S. Appl. No. 11/192,258, now U.S. Patent No. 7,547,038.

Office Action issued Feb. 24, 2009 in U.S. Appl. No. 11/714,037, now U.S. Patent No. 7,641,220.

Amendment and Response to Office Action issued Aug. 24, 2009 in U.S. Appl. No. 11/714,037, now U.S. Patent No. 7,641,220.

Notice of Allowance and Fee(s) Due issued Sep. 16, 2009 in U.S. Appl. No. 11/714,037, now U.S. Patent No. 7,641,220.

Office Action issued May 4, 2009 in co-pending U.S. Appl. No. 11/803,238, now U.S. Publication No. US-2008/0284142.

Amendment and Response to Office Action filed Nov. 4, 2009 in co-pending U.S. Appl. No. 11/803,238, now U.S. Publication No. US-2008/0284142.

Office Action issued Mar. 10, 2010 in co-pending U.S. Appl. No. 11/803,238, now U.S. Publication No. US-2008/0284142.

Amendment and Response to Office Action filed Jun. 4, 2010 in co-pending U.S. Appl. No. 11/803,238, now U.S. Publication No. US-2008/0284142.

Notice of Allowance and Fee(s) Due issued Jul. 9, 2010 in co-pending U.S. Appl. No. 11/803,238, now U.S. Publication No. US-2008/0284142.

Request for Continued Examination filed Aug. 9, 2010 in co-pending U.S. Appl. No. 11/803,238, now U.S. Publication No. US-2008/0284142.

Notice of Allowance issued Sep. 14, 2010 in co-pending U.S. Appl. No. 11/803,238, now U.S. Publication No. US-2008/0284142.

Restriction Requirement issued Aug. 11, 2010 in co-pending U.S. Appl. No. 12/544,952.

Amendment and Response to Requirement for Election of Species filed Oct. 11, 2010 in co-pending U.S. Appl. No. 12/544,952.

Notification of Transmittal of the International Search Report and the Written Opinion of the International Searching Authority issued May 2, 2006 in International Application No. PCT/US2006/017127.

Notification of Transmittal of the International Search Report and the Written Opinion of the International Searching Authority issued Sep. 29, 2008 in International Application No. PCT/US2008/055420.

Notification of Transmittal of the International Search Report and the Written Opinion of the International Searching Authority issued Sep. 4, 2008 in International Application No. PCT/US2008/059648.

Co-pending U.S. Appl. No. 12/555,486, titled Mounting Assemblies With Wrappers for Inflatable Curtain Airbags, filed Sep. 8, 2009.

Co-pending U.S. Appl. No. 12/689,813, titled Double-Sewn Airbag Mounting Assemblies, filed Jan. 19, 2010.

Co-pending U.S. Appl. No. 12/544,952, titled Inflatable Airbag Assemblies With Alignment Apertures, filed Aug. 20, 2009.

Co-pending U.S. Appl. No. 12/507,699, titled Inflatable Airbag Assemblies With Modular Components and Related Methods of Manufacture, filed Jul. 22, 2009.

Amendment and Response to Office Action filed Mar. 31, 2011 in co-pending U.S. Appl. No. 12/495,243, now published as U.S. Publication No. US 2010/0327564.

Office Action mailed Nov. 4, 2010 in co-pending U.S. Appl. No. 12/544,952, now published as U.S. Publication No. US 2011/0042923.

Notification of Transmittal of the International Search Report and the Written Opinion of the International Searching Authority issued Mar. 14, 2011 in International Application No. PCT/US2011/021662.

* cited by examiner

AIRBAG MOUNTING ASSEMBLIES WITH DOUBLE-LOCKING WRAPPERS

TECHNICAL FIELD

The present disclosure relates generally to the field of automotive protective systems. More specifically, the present disclosure relates to mounting assemblies with wrappers and related methods.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated. Further, analogous structures or features in different depicted embodiments are identified with like reference numerals, with a leading hundreds numeral incremented to a higher value.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag 110, overhead airbag, front airbag, or any other airbag type.

Inflatable curtain airbag 110 may be used to protect the passengers of a vehicle during a side collision or roll-over collision. Inflatable curtain airbag 110 typically extend longitudinally within the vehicle and are usually coupled to or next to the roof rail of the vehicle. The inflatable curtain airbag 110 may expand in a collision scenario along the side of the vehicle between the vehicle passengers and the side structure of the vehicle. In a deployed state, an inflatable curtain airbag 110 may cover at least a portion of side windows and a B-pillar of the vehicle. In some embodiments, inflatable curtain airbag 110 may extend from an A-pillar to a C-pillar of the vehicle. In other embodiments, inflatable curtain airbag 110 may extend from the A-pillar to a D-pillar of the vehicle.

Inflatable curtain airbag 110 is typically installed adjacent the roof rail of a vehicle in an undeployed state, in which the inflatable curtain airbag 110 is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. The extended and inflated airbag may be said to be in a deployed configuration. Thus, an airbag mounting apparatus typically allows for a secure connection between the vehicle and the airbag, yet allows the airbag to change configurations from the packaged configuration to the deployed configuration.

Figure 1A:
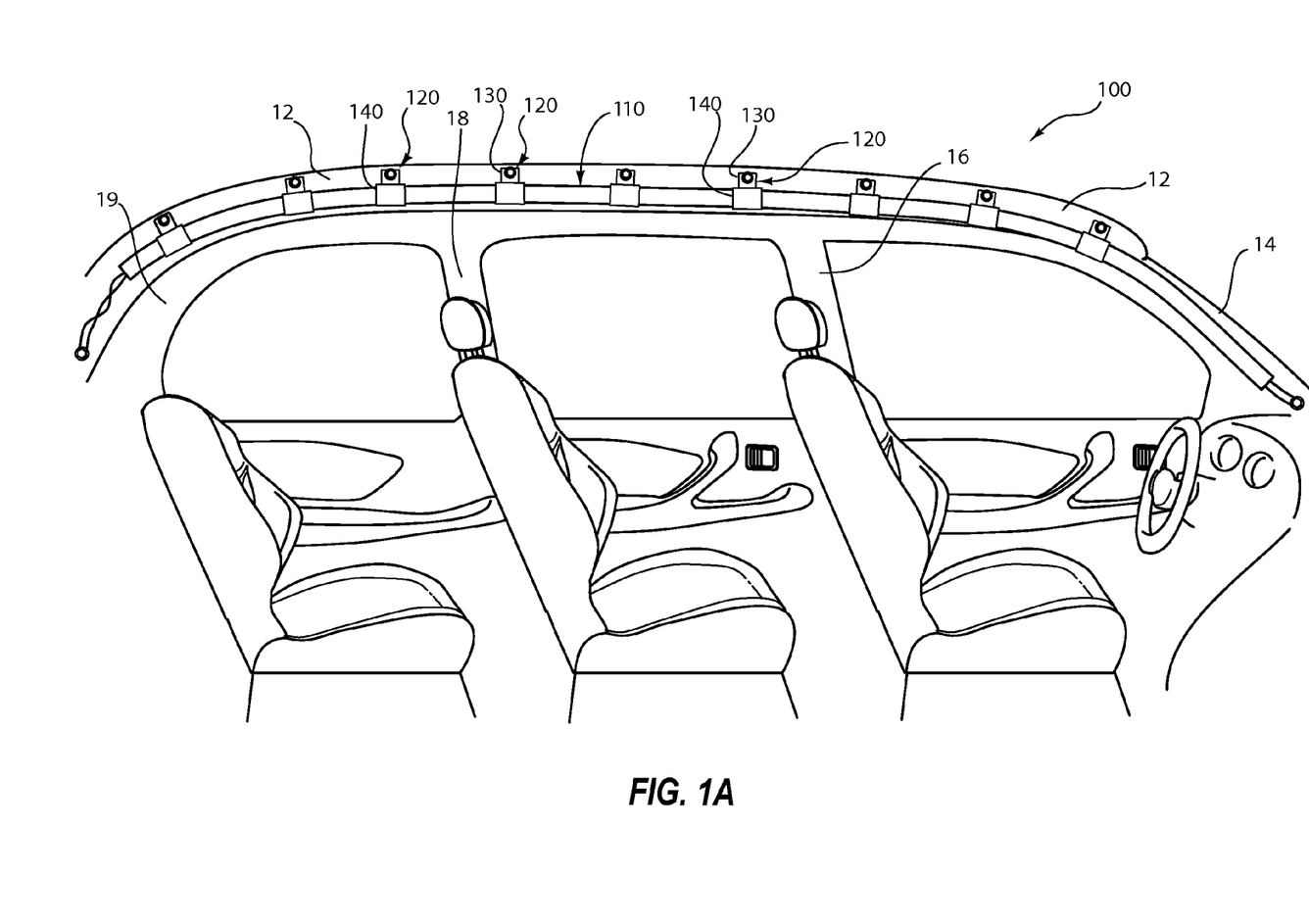
FIG. 1A is a perspective view of one embodiment of an airbag assembly, wherein the airbag assembly comprises a mounting assembly that is coupled to an airbag, wherein the mounting assembly is retaining the airbag in a packaged configuration.

FIG. 1A depicts airbag assembly 100 from a perspective view, wherein a mounting assembly 120 is coupled to an inflatable curtain airbag 110 that is in a packaged configuration, and is mounted adjacent a roof rail 12 of a vehicle. Airbag assembly 100 may comprise an inflatable curtain airbag 110, and an airbag mounting assembly 120. A plurality of mounting assemblies 120 may be employed to couple curtain airbag 110 to a vehicle. Mounting assembly 120 may comprise a mounting member 130 and a wrapper 140. Mounting assembly 120 may be employed to couple inflatable curtain airbag 110 adjacent a vehicle roof rail 12, or other vehicle structure. Airbag assembly 100 may further comprise an inflator (not shown). In the depicted embodiment, inflatable curtain airbag 110 extends from an A-pillar 14 to a D-pillar 19. Inflatable curtain airbag 110 also extends past a B-pillar 16 and a C-pillar 18 such that in a deployed configuration, the inflatable curtain airbag at least partially covers the B- and C-pillars, as depicted in FIG. 1B.

Figure 1B:
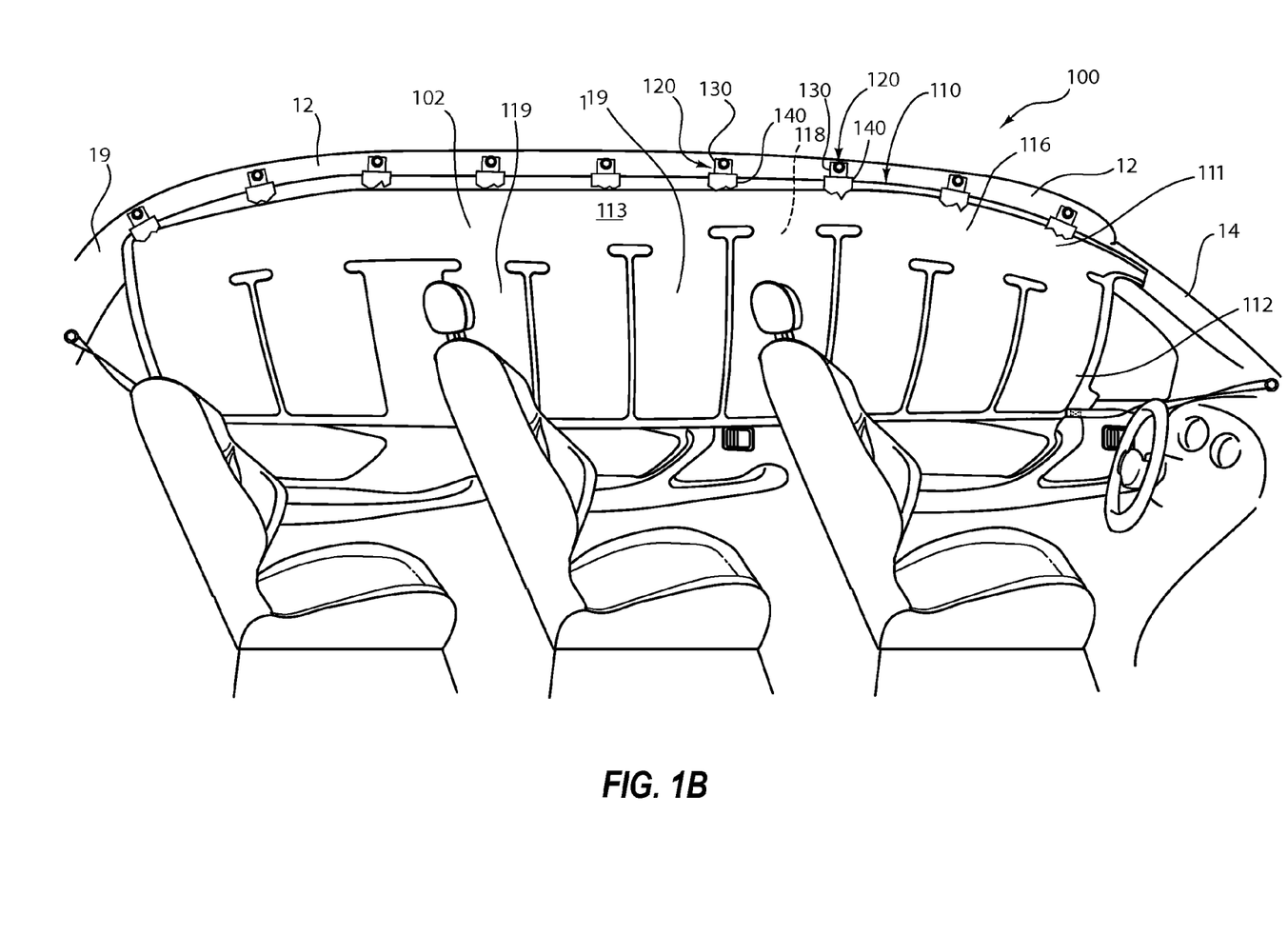
FIG. 1B is a perspective view of the airbag assembly of FIG. 1A, wherein the airbag is in a deployed configuration.

FIG. 1B is a perspective view of inflatable curtain airbag assembly 100, wherein the airbag is depicted in a deployed configuration. Inflatable curtain airbag 110 is configured to become inflated upon activation of one or more inflators such that the airbag transitions from the packaged configuration to the deployed configuration. During deployment, wrapper 140 is configured to rupture such that inflatable curtain airbag 110 can adopt the deployed configuration. In the deployed and in an extended configuration, such as before rolling and/or folding, inflatable curtain airbag 110 may be described as having an upper portion 111, a lower portion 112, a front face 113, and a rear face (not visible). The various faces of inflatable curtain airbag 110 define an inflatable void 118, which is in fluid communication with an inflator (not visible). Inflatable void 118 may be divided into inflation cells 119 via stitching. The various faces of inflatable curtain airbag 110 may comprise panels of a woven nylon fabric that are coupled together at a seam to form the inflatable void.

Upper portion 111 of inflatable curtain airbag 110 is the portion of the airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag, but may include less than half, more than half or exactly half of the bottom portion of the inflatable curtain airbag. Likewise, the term "upper portion" is not necessarily limited to the portion of inflatable curtain airbag 110 that is above a horizontal medial plane of the airbag, but may include less than half, more than half or exactly half of the top portion of the airbag.

Upon activation, the inflator rapidly generates and/or releases inflation gas, which rapidly inflates the inflatable curtain airbag 110. The inflator may be one of several types, such as pyrotechnic, stored gas, or a combination inflator and may comprise a single or multistage inflator. As inflatable curtain airbag 110 becomes inflated, tension is applied to wrapper 140, which causes the wrapper to rupture, and therefore, cease to retain the airbag in the packaged configuration.

As will be appreciated by those skilled in the art, a variety of types and configurations of airbag inflatable curtain airbags can be utilized without departing from the scope and spirit of the present disclosure. For example, the size, shape, and proportions of the inflatable curtain airbag may vary according to its use in different vehicles or different locations within a vehicle. Also, the inflatable curtain airbag may comprise one or more of any material well known in the art, such as a woven nylon fabric. Additionally, the airbag inflatable curtain airbag may be manufactured using a variety of techniques such as one piece weaving, cut and sew, or a combination of the two techniques. Further, the inflatable curtain airbag may be manufactured using sealed or unsealed seams, wherein the seams are formed by stitching, adhesive, taping, radio frequency welding, heat sealing, or any other suitable technique or combination of techniques.

Figure 2:
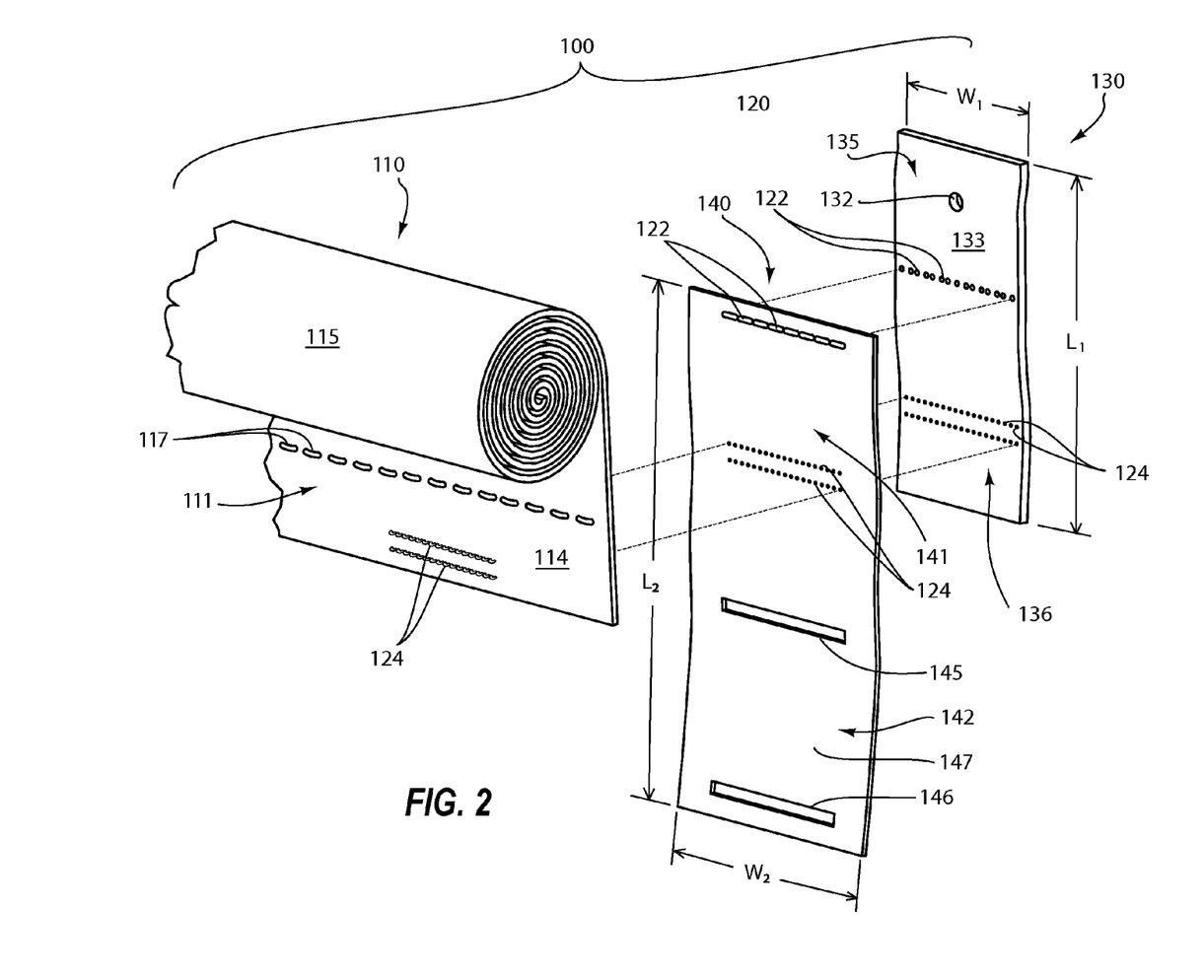
FIG. 2 is an exploded perspective view of the airbag assembly of FIG. 1A, wherein the airbag has been partially cutaway.

FIG. 2 depicts airbag assembly 100 from an exploded perspective view in which inflatable curtain airbag 110 is partially cutaway. Mounting assembly 120 may comprise mounting member 130 and wrapper 140. Mounting member 130 may comprise a flexible fabric, such as a woven nylon material. In one embodiment, the mounting member may comprise a nylon monofilament, such as seat belt webbing. Mounting member may comprise more than one layer of fabric. In the depicted embodiment, mounting member 130 comprises a rectangular piece of seat belt webbing. Mounting member 130 has a mounting aperture 132, a front side 133, a rear side (not visible), a top portion 135, and a bottom portion 136. The mounting aperture 132 is located on the top portion 135. Mounting aperture 132 is configured to receive a fastener, such as a bolt or a mounting structure coupled to the vehicle that protrudes through the aperture. Top and bottom portions 135 and 136 refer to an approximate upper half and lower halves, respectively, when mounting member 130 is in the same orientation as depicted in FIG. 2.

By way of example, and not of limitation, mounting member 130 may comprises a width $W_1$ that is within a range of from about 40 mm to about 80 mm, and a length $L_1$ that is within a range of from about 80 mm to about 150 mm. A center of aperture 132 is located within a range of from about 20 mm to about 30 mm from a top edge of top portion 135. One skilled in the art will recognize that the width and length of the mounting member may be varied for use with different vehicles, wrappers, or airbags. In the depicted embodiment, $W_1$ is 48 mm, $L_1$ is 100 mm, aperture 132 is 25 mm from the top edge of top portion 135, and stitching 122 is 40 mm from the top edge of top portion 135.

One skilled in the art will also recognize that a variety of types of fabrics may be used to form the mounting member without departing from the spirit of this disclosure. In another embodiment, the mounting member may comprise any one of a variety of materials, such as a thermoplastic material or other polymer. Likewise, the mounting member may comprise a variety of shapes. For example, the mounting member may be square, triangular, round, trapezoidal, or pentagonal. Further, the mounting member may comprise more or fewer apertures than described herein. For example, in one embodiment, the mounting member comprises two mounting apertures, and in another embodiment, the mounting member comprises three mounting apertures. Further, the location of the apertures may vary from the depiction of FIG. 2.

Wrapper 140 may comprise a rectangular piece of a frangible material, such as a non-woven nylon, polypropylene, or a plastic film. Wrapper 140 has a first half 141 and a second half 142. First half 141 is configured such that it can be attached to mounting member 130 via stitching 122. Second half 142 has a first opening 145 and a second opening 146, which are each configured as an elongated slot. Openings 145 and 146 may each comprise a cutout portion of wrapper 140, or a slit cut into the wrapper. First and second openings 145 and 146 are each configured to receive, or slide over, mounting member 130 and thereby retain airbag assembly 100 in the packaged configuration. As such, a length of wrapper 140 and a width of each of the openings 145 and 146 are of predetermined magnitudes and may vary according to their use with different airbags. Generally, first and second openings 145 and 146 may each be about the same as the width of mounting member 130 ($W_1$). Wrapper 140 also comprises a portion 147 that is located between first and second openings 145 and 146.

As noted herein, wrapper 140 is configured to fail during airbag 110 deployment since wrapper 140 comprises a frangible material, the wrapper may rupture at any point; however, when deployed from the packaged configuration, wrapper 140 is most likely to rupture at first opening 145. As such, when curtain airbag 110 is packaged in a predetermined manner, predetermined deployment characteristics such as trajectory and speed can be consistently achieved. Wrapper 140 is configured to be completely severed such that after airbag 110 deployment, the wrapper comprises two separate pieces of material. In another embodiment, the wrapper may comprise a predetermined rupture point that may be defined by perforations, tear stitching, or a portion of the wrapper that is weakened in some manner.

Mounting member 130 and wrapper 140 may be attached together independent of an airbag; thus, when coupled together, the mounting member and wrapper may be called a mounting assembly. The coupled mounting member and wrapping member may also be called a sub-assembly of an airbag assembly. Mounting assembly 120 is configured to be attached to an airbag cushion via stitching 124, which may extend through airbag cushion 110, wrapper 140, and mounting member 130. As such, stitching 122, which is employed to attach mounting member 130 to wrapper 140 may comprise a tack stitch.

By way of example, and not of limitation, a width $W_2$ of wrapper 140 may be between about 60 mm and about 100 mm, a length $L_2$ may be between about 145 mm and about 175 mm, stitching 122 may be between about 3 mm and about 10 mm from a top edge of first half 141, a center of first opening 145 may be located between about 85 mm and about 105 mm from the top edge of the first half, and a center of second opening 146 may be located between about 135 mm and about 155 mm from the top edge of the first half. In the depicted embodiment, $W_2$ of wrapper 140 is 75 mm, $L_2$ is 160 mm, stitching 122 is located 5 mm from the top edge of first half 141, first opening 145 is 95 mm from the top edge of the first half, second opening 146 is 148 mm from the top edge of the first half, and a width of each of the first and second openings is 48 mm.

For clarity, inflatable curtain airbag 110 is cutaway in FIG. 2. Curtain airbag 110 has been manipulated into a rolled configuration and oriented such that top portion 111 is turned downward, and rear face 114 is facing forward. In the rolled configuration, airbag 110 has an outer surface 115, which may be defined by the front face of the airbag. Top portion 111 of inflatable curtain airbag 110 may be coupled to mounting assembly 120 at first half 141 of wrapper 140. Inflatable curtain airbag 110 may be coupled to the assembly at a non-inflatable portion, such as an area outside of seam 117. As noted above, inflatable curtain airbag 110 may be coupled to mounting assembly 120 via stitching 124, which protrudes through wrapper 140 and mounting member 130. If mounting member 120 and wrapper 130 are not attached together as a sub-assembly before being coupled to airbag 110, airbag assembly 100 may not comprise both stitching 122 and 124, but rather may only comprise one set of stitching that couples together the airbag, the wrapping member, and the mounting member.

Figure 3A:
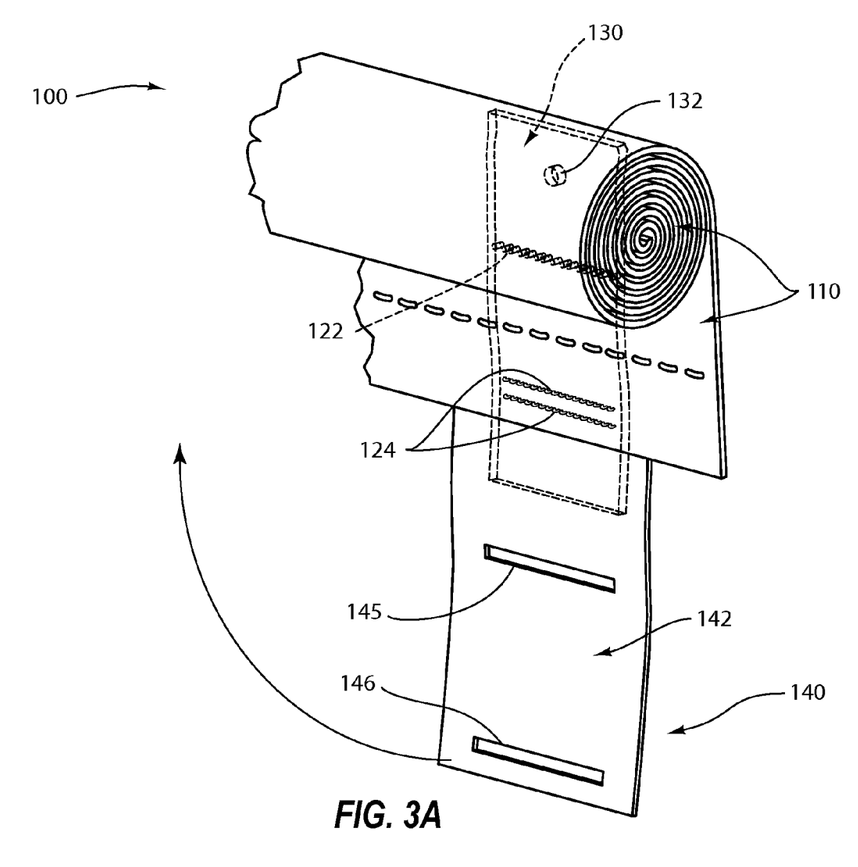
FIG. 3A is a cutaway perspective view of the airbag assembly of FIG. 1A, wherein the airbag has been rolled, but has not yet been wrapped.
Figure 3B:
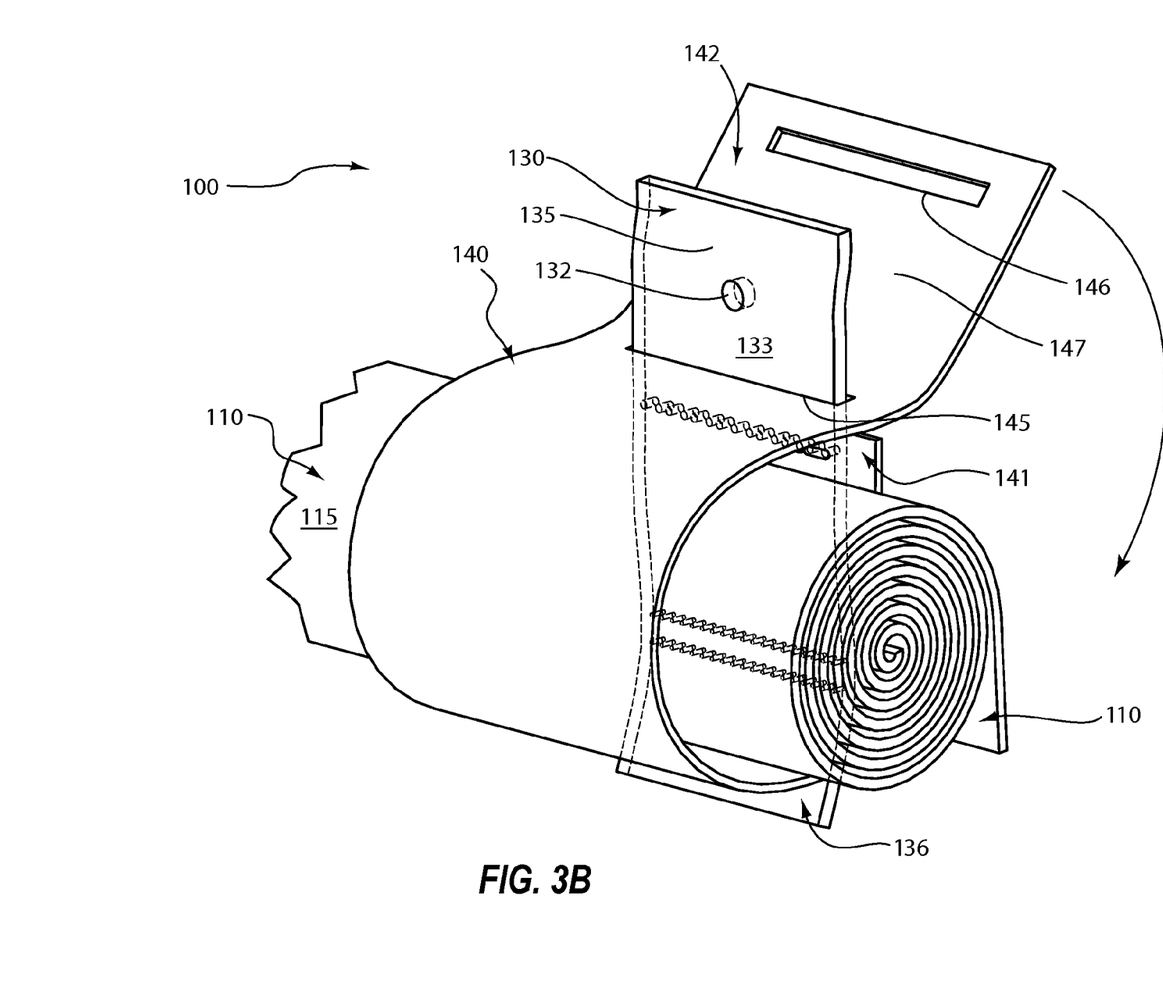
FIG. 3B is a cutaway perspective view of the airbag assembly of FIG. 3A, wherein a wrapper of the mounting assembly is being wrapped around the airbag.

FIGS. 3A-B depict airbag assembly 100 being manipulated into the packaged configuration, starting at a point after airbag 110 has been coupled to mounting member 130 and wrapper 140. Collectively, FIGS. 2-4, and their associated text, may be said to comprise a method for manufacturing an inflatable curtain airbag assembly, a method for manufacturing a mounting assembly, a method for packing an inflatable curtain airbag, a method for coupling an inflatable curtain airbag to a vehicle, and any combination of the preceding methods.

FIG. 3A is a perspective view of airbag assembly 100, wherein inflatable curtain airbag 110 has been partially cutaway. Rolled airbag 110, mounting member 130 and wrapper 140 are coupled together via stitching 122 and 124. As depicted in the view of FIG. 3A, airbag 110 is most forward, mounting member 130 is most rearward, and wrapper 140 is sandwiched between them. These components are assembled in a predetermined orientation such that second half 142 of wrapper 140, with first and second openings 145 and 146, extends beyond mounting member 130 and airbag 110, such that the second half can be directed away from mounting member 130 in the direction of airbag 110. Wrapper 140 may continue to be wrapped around outer surface 115 of airbag 110 until first opening 145 is adjacent to the top portion of mounting member 130.

FIG. 3B is a cutaway perspective view of airbag assembly 100 of FIG. 3A after wrapper 140 has been wrapped around outer surface 115 of inflatable curtain airbag 110 and is being coupled to mounting member 130. Second half 142 of wrapper 140 may continue to be directed toward mounting top portion 135 of mounting member 130 until first opening 145 is adjacent to, and aligned with, the top portion of the mounting member. First opening 145 may be slid over top portion 135 such that first opening 145 receives top portion 135 and such that second opening 146 of wrapper 140 is located on the rear-face side of mounting member 130. Second half 142 may then be pushed down toward airbag 110 and first half 141. Second half 142 and specifically, second opening 146 may continue to be wrapped toward the back face of mounting member 130 in the direction of bottom portion 136, such that portion 147, which is located between openings 145 and 146, is adjacent to the rear face of the mounting member.

Figure 4:
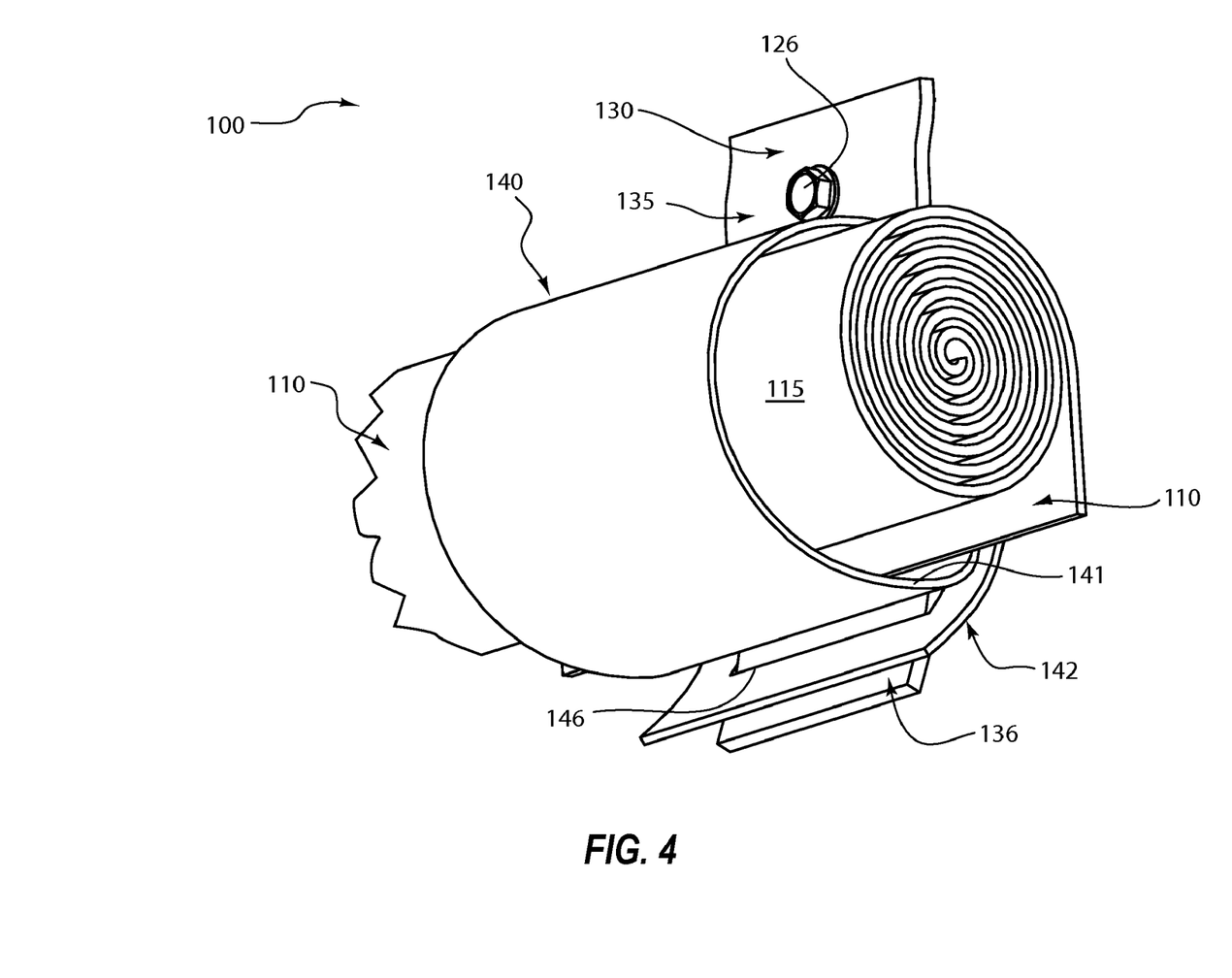
FIG. 4 is another cutaway perspective view of the airbag assembly of FIG. 3B, after the airbag has been wrapped by the wrapper.

FIG. 4 is another cutaway perspective view of airbag assembly 100 of FIG. 3B after inflatable curtain airbag 110 has been wrapped and retained in a packaged configuration. The view of FIG. 4 is from a lower perspective than FIGS. 3A-B such that relationships between mounting member 130 and wrapper 140 are visible. Second opening 146 of wrapper 140 has been slid over bottom portion 136 of mounting member 130 such that the second opening has received the bottom portion and second half 142 of the wrapper is retained on the mounting member. Second half 142 of wrapper 140 partially overlaps first half 141, but is separated by mounting member 130. In the depicted embodiment, bottom portion 136 of mounting member 130 has squared corners with right angles and no features to aid the retention of second half 142 of wrapper 140 on the bottom portion of the mounting member; however in another embodiment, the bottom portion of the wrapping member may comprise features to aid in the retention of the wrapper. For example, in one embodiment, the sides of the bottom portion of the mounting member comprises indentations into which the second opening of the wrapper can fit and thereby be retained.

Wrapper 140 retains airbag 110 by circumnavigating the rolled airbag, wherein the wrapper abuts outer surface 115. Wrapper 140 may determine the circumference of rolled airbag 110, or alternatively, the circumference of the rolled airbag may determine the length of the wrapper. Wrapper 140 may fit snugly around airbag 110 such that the wrapper applies a squeezing pressure to the airbag. Mounting member 130 is depicted as having a bolt 126 projecting into and through the mounting aperture, which is located on top portion 135 of the mounting member. When mounted in a vehicle, gravity may tend to exert a downward force on assembly 100; however, because wrapper 140 is coupled to mounting member via the two wrapper openings, wrapper 140 does not tend to tighten or "creep" on airbag 110.

Figure 5A:
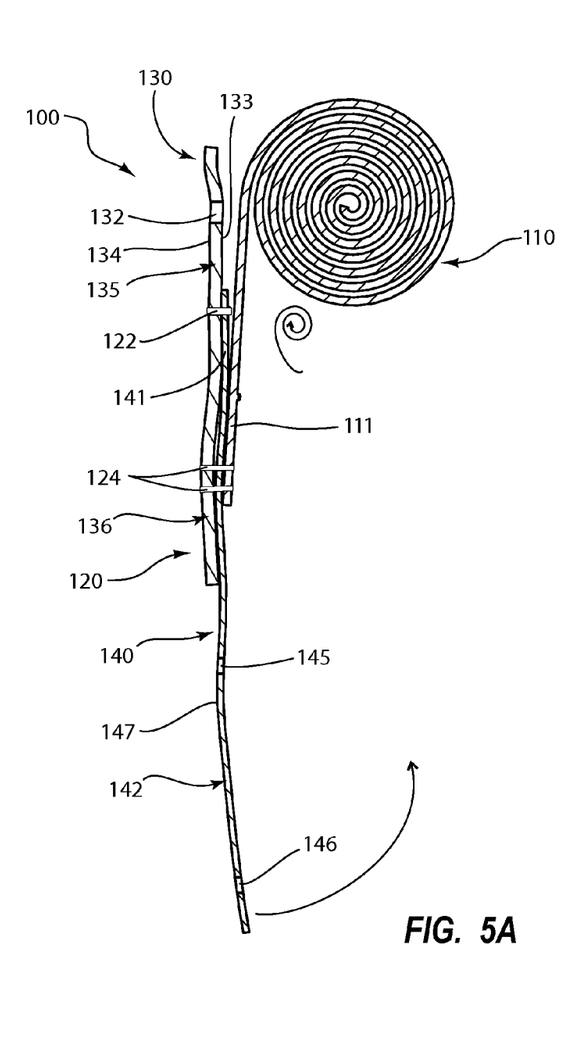
FIG. 5A is a cross-sectional view of the airbag assembly of FIG. 1A before the airbag has been rolled and wrapped.
Figure 5B:
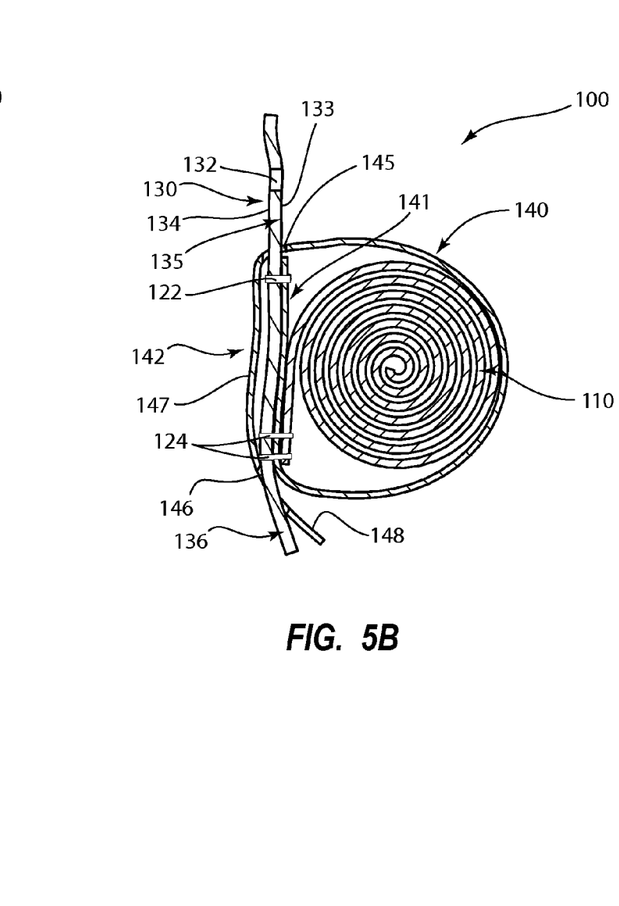
FIG. 5B is a cross-sectional view of the airbag assembly of FIG. 5A after the airbag has been rolled and wrapped.

FIGS. 5A and 5B are cross-sectional views of airbag assembly 100, wherein FIG. 5A depicts the assembly before the inflatable curtain airbag 110 has been rolled and wrapped and FIG. 5B depicts the assembly in the packaged configuration. Mounting member 130 comprises front side 133, back side 134, top portion 135, which has mounting aperture 132, and bottom portion 136. Wrapper 140 comprises first half 141 that is coupled to mounting member 130 via stitching 122 to form mounting assembly 120. The wrapper also has a second half 142, which extends below rolled airbag 110 and has first opening 145 and second opening 146. Portion 147 is located on second half 142, between first and second openings 145 and 146. Upper portion 111 of inflatable curtain airbag 110 is coupled to first half 141 of wrapper 140 via stitching 124.

In the depiction of FIG. 5B, airbag assembly 100 is in the packaged configuration. Wrapper 140 has been wrapped around the outer surface of rolled inflatable curtain airbag 110. First opening 145 in second half 142 has been placed over top portion 135 of mounting member 130. First opening 145 may receive part of first half 141 as well as mounting member 130. Second opening 146 in second half 142 has been placed over bottom portion 136 of mounting member 130. As such, first half 141 of wrapper 140 is attached on front side 133 of mounting member 130; portion 147, located between openings 145 and 146 on second half 142 of wrapper 140, is located on back side 134 of mounting member 130; and an end portion 148 of second half 142 is located on front side 133.

Figure 6:
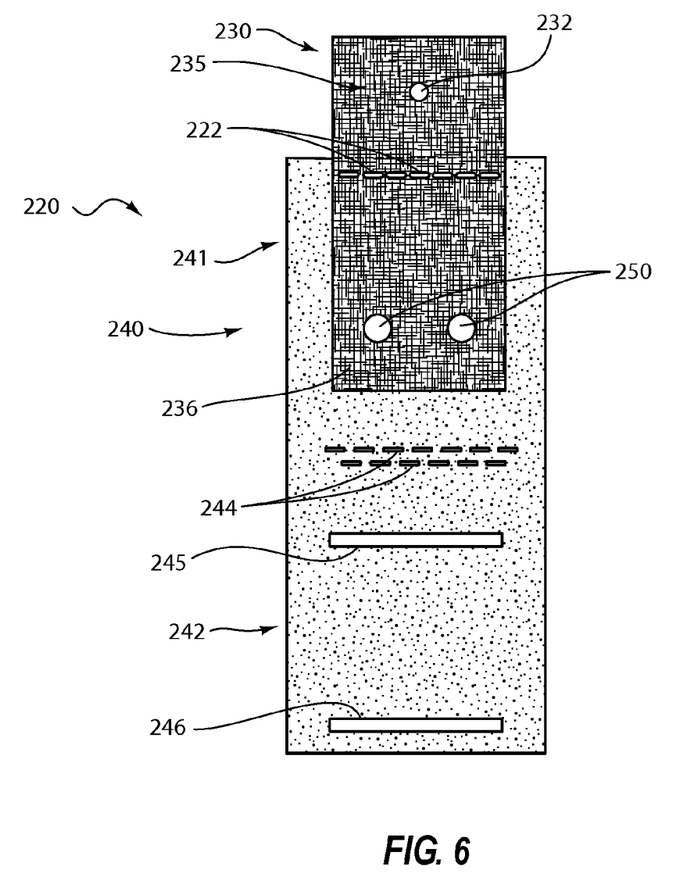
FIG. 6 is a front elevation view of another embodiment of an airbag mounting assembly.

FIG. 6 depicts another embodiment of a mounting assembly 220 from a front elevation view. Mounting assembly 220 may be configured similarly and may function similarly as mounting assembly 120, described herein. Mounting assembly 220 may comprise a mounting member 230 and a wrapper 240. Mounting member 230 may comprise a woven nylon fabric, such as seatbelt webbing, which is configured such that the mounting member comprises a top portion 235 and a bottom portion 236. Top portion 235 may comprise one or more mounting apertures 232.

Wrapper 240 comprises a non-frangible material with a first half 241 and a second half 242, wherein the first half is coupled to mounting member 230 via stitching 222. Wrapper 240 is configured to function similarly as wrapper 140, described herein. As wrapper 240 is non-frangible, a rupture point 244 may be introduced into the wrapper. In the depicted embodiment, rupture point 244 comprises perforations; however, in other embodiments, the rupture point may comprise a tear seam or a weakened portion of the wrapper. Rupture point 244 is located at a predetermined position, such that during deployment, an inflatable curtain airbag wrapped by the wrapper will follow a predetermined deployment trajectory. Wrapper 240 has a first opening 245 and a second opening 246, wherein first opening 245 is configured to receive top portion 235 of mounting member 230 and second opening 246 is configured to receive bottom portion 236 of the mounting member, as described herein for openings 145 and 146.

The mounting assemblies disclosed herein may be attached to the airbag cushion at predetermined locations by employing a variety of mechanisms and/or techniques which are well known in the art. In one embodiment, the mounting assembly and airbag may be placed on a work table that has features that aid the working in placing the mounting assembly on the airbag at the predetermined location. The mounting assembly itself may comprise assembly aids, which allow the mounting assembly to be located at a predetermined location on the airbag. In one embodiment, bottom portion 236 of mounting member 230 and first half 241 of wrapper 240 may comprise one or more assembly aids 250. In the depicted embodiment, the assembly aids comprise apertures 250. Apertures 250 are located in predetermined locations on mounting member 230 and wrapper 240 such that when the mounting member and wrapper are coupled together, the apertures overlap. Apertures 250 may be employed in conjunction with a feature located on the inflatable airbag, such that the feature on the cushion may be viewed through the apertures when the mounting assembly is correctly located on the cushion.

Figure 7:
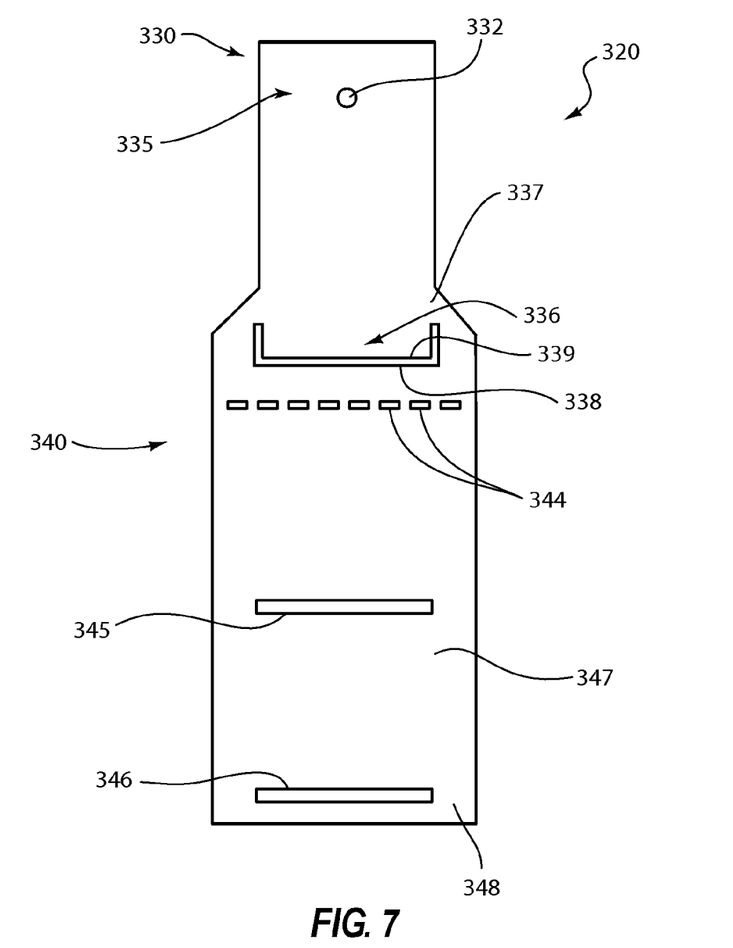
FIG. 7 is a front elevation view of another embodiment of an airbag mounting assembly.

FIG. 7 is a front elevation view of another embodiment of an airbag mounting assembly 320, wherein the mounting assembly comprises an integrated mounting member 330 and wrapper 340. Mounting assembly 320 may be called a one-piece mounting assembly. One skilled in the art will recognize that although the embodiment depicted in FIG. 7 is not an "assembly" of disparate parts, it is another embodiment of the mounting assemblies described herein. Mounting assembly 320 may also be called an integrated mounting member and wrapper; or an airbag mounting and wrapping unit. Mounting member portion 330 of the one-piece mounting member/wrapper 320 may comprise a mounting aperture 332 that is located on top portion 335. Bottom portion 336 of mounting member portion 330 may terminate in a slot 338 that defines a terminus 339 of mounting member portion 330. Terminus 339 is configured to receive second opening 346 of wrapper portion 340, when mounting assembly 320 is retaining an airbag in a packaged configuration. Shoulder portions 337 define contiguous extensions of the material from which mounting assembly is formed, wherein the shoulder portions connect mounting member portion 330 with wrapper portion 340.

Wrapper portion 340 may be configured similarly and may function similarly as wrappers 140 and 240, described herein. Wrapper portion 340 may comprise a first opening 345, a second opening 346, a portion 347 that is located between the first and second openings, a rupture point 344, and an end portion 348. First opening 345, second opening 346, portion 347, and rupture point 344 may be configured similarly as analogous structures described herein. Rupture point 344 may comprise perforations that are located between slot 338 and first opening 345. End portion 348 may be configured similarly as analogous end portions, described herein; however end portion 348 may have a different orientation when in a packaged configuration compared to analogous end portions described herein.

Mounting assembly 320 may comprise multiple layers of material formed by folding a contiguous piece of material one or more times or by sewing disparate pieces of material togethers. In one embodiment, the multiple layer portion extends from the top edge of the top portion of the mounting member to below the shoulder portions. In another embodiment, the multiple layer portion extends below the slot in the mounting member portion. In another embodiment, the multiple layer portion extends to a location just above the rupture point, which may be located in a different location than depicted in FIG. 7.

One skilled in the art will recognize that a variety of configurations of one-piece mounting assemblies may be employed without diverging from the spirit of the present disclosure. For example, the mounting portion may be any suitable shape, and is not restricted to the rectangular shape of the depicted embodiment. Also, the shoulder portions may vary from the depicted embodiment; for example, the shoulder portions may be rounded, or may comprise squared edges with substantially right angles. Further, in some embodiments, the shoulder portions may not be present at all. For example, in one embodiment, the width of the mounting portion is similar to the width of the wrapper portion, such that shoulder portions are not apparent. In such an embodiment, the one-piece mounting assembly may still comprise a flexible portion that is located adjacent to the slot.

Figure 8:
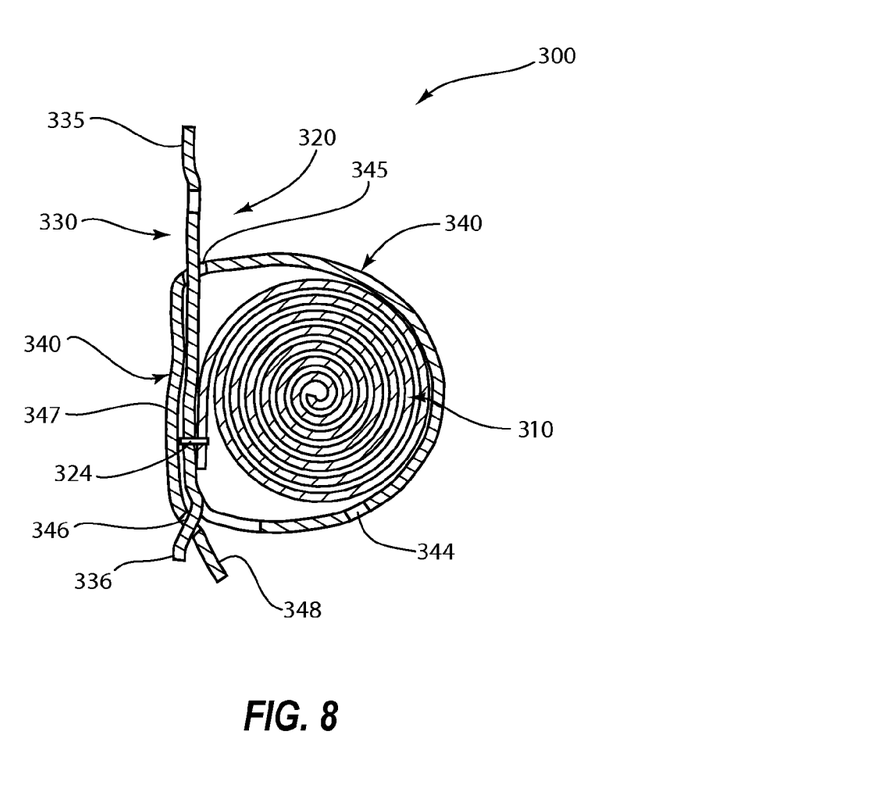
FIG. 8 is a cross-sectional view of the airbag mounting assembly of FIG. 7.

FIG. 8 is a cross-sectional view of airbag mounting assembly 320 of FIG. 7, wherein the mounting assembly is coupled to an inflatable curtain airbag 310 and is retaining the airbag in a packaged configuration. In the depicted embodiment, mounting assembly 320 is coupled to an inflatable curtain airbag 310 via stitching 324, such that the airbag and mounting assembly comprise an inflatable airbag assembly 300. Mounting member portion 330 comprises a top portion 335, a bottom portion 336, which comprises a terminus. Wrapper portion 340 comprises a rupture point 344, a first opening 345, a second opening 346, a portion 347 that is between the first and second openings, and an end portion 148. In the depiction of FIG. 8, inflatable curtain airbag 310 is in a rolled configuration and is retained in the rolled configuration by wrapper portion 340.

Wrapper portion 340 may be retained in a packaged configuration by first opening 345 being placed over top portion 335 of the wrapper portion, and second opening 346 being placed over bottom portion 336 of mounting member portion 330. Rupture point 344 is located at a predetermined position such that during inflatable curtain airbag deployment, the rupture point aids in the airbag achieving a predetermined trajectory. As described herein, the mounting members and mounting member portions may comprise more than one layer of material, wherein the additional layers of material end before the wrapper or the shoulder portions of the one-piece mounting assembly. In the embodiment depicted in FIGS. 7-8, wrapper portion 340 may flex or bend at shoulder portion 337, as well as along the length of wrapper portion 340.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. A packaged inflatable curtain airbag assembly, comprising:
   a mounting member comprising a rectangular piece of woven nylon webbing, wherein the mounting member has a top portion and a bottom portion;
   a wrapper comprising a rectangular piece of flexible material with a first half, a second half, a first elongated slot, and a second elongated slot, the first slot being closer to the first half of the wrapper than the second slot, wherein the wrapper is attached to the top portion of the mounting member at the first half via a first set of stitching, and wherein each of the first and second elongated slots are located on the second half of the wrapper; and,
   a rolled inflatable curtain airbag, wherein in an extended configuration, the inflatable curtain airbag has a top portion, and wherein the top portion is attached to the mounting member and the wrapping member via a second set of stitching so that the stitches protrude through the inflatable curtain airbag, the wrapper, and the mounting member,
   wherein the wrapper circumnavigates the rolled inflatable curtain airbag, the first slot of the wrapper receives the top portion of the mounting member, and the second slot of the wrapper receives the bottom portion of the mounting member, such that a portion of the wrapper that is between the first slot and the second slot is located on a back side of the mounting member.

2. The packaged inflatable curtain airbag assembly of claim 1, wherein the wrapper comprises a frangible material.

3. The packaged inflatable curtain airbag assembly of claim 2, wherein the frangible material comprises a non-woven material.

4. The mounting assembly of claim 3, wherein the frangible material comprises a plastic film.

5. The mounting assembly of claim 3, wherein the wrapper has a rupture point to facilitate rupturing during inflatable curtain airbag deployment.

6. The mounting assembly of claim 5, wherein the rupture point of the wrapper comprises perforations.

7. The mounting assembly of claim 1, wherein the wrapper comprises a non-frangible material, and wherein the wrapper has a rupture point to facilitate rupturing during inflatable curtain airbag deployment.

8. The mounting assembly of claim 1, wherein the rupture point of the wrapper comprises perforations.

9. The mounting assembly of claim 1, wherein the mounting member and the wrapper comprise a one-piece mounting assembly that is formed from a contiguous piece of material.

10. The mounting assembly of claim 9, wherein the one-piece mounting assembly comprises a non-frangible material.

11. The mounting assembly of claim 10, wherein the wrapper comprises a rupture point.

* * * * *